UNITED STATES PATENT OFFICE.

GILBERT JOHN FOWLER, OF URMSTON, NEAR MANCHESTER, ENGLAND.

PROCESS OF EXTRACTING LAC DYE.

954,949. Specification of Letters Patent. Patented Apr. 12, 1910.

No Drawing. Original application filed November 19, 1908, Serial No. 463,437. Divided and this application filed July 15, 1909. Serial No. 507,814.

*To all whom it may concern:*

Be it known that I, GILBERT JOHN FOWLER, a subject of the King of Great Britain, residing at Broad Oak, Urmston, near Manchester, in the county of Lancaster, England, consulting chemist, have invented a certain new and useful Improved Process for the Extraction of Lac Dye, of which the following is a specification.

This invention, which was originally included in my application for patent filed 19th November 1908, Serial No. 463,437, relates to a process for obtaining pure lac-dye from stick-lac or other crude material containing shellac. Lac-dye as at present known is obtained by washing stick-lac, collecting the sediment from the washings and pressing it into cakes. These cakes are highly impure, containing a large proportion of shellac and wax together with mineral matter. The dye is present as a mineral lake and is only sparingly soluble in water; it is extremely difficult to obtain any pure dye from this source and for this reason Schmidt (*Deutsche Chemicshe Gesellschaft, Berichte* XXI (1) 1887, page 1285) was only able to procure a very small yield of crystalline dye from the commercial dye, and, moreover, found it almost impossible to obtain the dye free from mineral matter.

It is known that the pure dye is soluble in alkalies, but when the attempt is made to extract it by alkali from either stick-lac or the commercial dye, so much shellac dissolves together with it that a separation cannot be effected. It is also known that the pure dye is soluble in solvents like alcohol and it has been concluded that such solvents, which also dissolve shellac, could not serve for separation of the dye.

I have discovered that what is true with regard to the behavior of the pure dye toward alcohol and aceton is not true with regard to the dye in the condition in which it exists in stick-lac. For when the latter is treated with solvents which will dissolve the shellac and wax the amount of dye that passes into solution is insignificant.

My invention consists therefore in obtaining pure lac-dye by extracting the shellac and wax from stick-lac by a suitable solvent, such as hot alcohol or aceton, and then treating the residue from the preceding hot alcoholic extractions, which consists of lac-dye and woody matter, with sufficient aqueous alkali to dissolve the color. The alkaline solution is filtered from the woody matter and may be concentrated if so desired by vacuum distillation. The solution so obtained is now treated with slight excess of a mineral acid such as sulfuric or hydrochloric acids. The greater part of the dye is precipitated and may be washed with a minimum proportion of water and air dried. The mother liquor and the washings contain a considerable proportion of dye which may be recovered by evaporation, or they may, on the other hand be again rendered alkaline and used as a solvent on fresh material. This last method is advantageous in that the accumulation of salts thereby produced facilitates precipitation of the dye on subsequent acidifications.

Lac free dye can be fermented in order to eliminate such albuminous matter as may be present. It must be noted that while neutral alkali solutions are fairly permanent, oxidation is liable to take place if excess of alkali be employed, in such cases the addition of a suitable reducing agent such as a sulfite will render the solution more permanent.

The dye obtained in my process differs entirely from any commercial product in that it is in the main pure color, whereas commercial lac-dye consists of a small and varying proportion of dye mixed with a much larger proportion of extraneous matter.

The following example illustrates the invention:—A steam heated extractor provided with a condenser is charged with 100 kilos of stick-lac which are extracted with 150–200 liters of methylated spirit at a temperature of about 70° C. After decantation the residue is similarly treated with further addition of 100–150 liters of spirit until completely exhausted. The residue in the extractor after recovery of the retained alcohol, is now treated, either with or without previous grinding and screening, with a hot or cold solution of caustic soda of 0.2–1 per cent. strength, or its equivalent of sodium carbonate. The solution is rendered slightly acid with hydrochloric or sulfuric acid, the impure precipitated coloring matter filtered off, washed and dried. The liquor from the precipitated dye can be evaporated to obtain a further quantity of coloring matter of a greater degree of purity.

Having thus described the nature of my said invention and the best means I know of carrying the same into practical effect, I claim:—

A process for obtaining pure lac-dye from stick-lac or other crude material containing shellac and lac-dye, which process consists in heating the crude material with a solvent for shellac and the wax which accompanies it, then extracting the residue with an alkaline solution, and then acidifying the alkaline solution whereby the dye is precipitated.

In testimony whereof I have signed my name to this specification in the presence of two subscribing witnesses.

GILBERT JOHN FOWLER.

Witnesses:
JOSEPH WILLARD,
WALTER J. SKERTEN.